(12) United States Patent
Maloncon

(10) Patent No.: US 6,386,702 B1
(45) Date of Patent: May 14, 2002

(54) FULLY ADJUSTABLE GLARE REDUCTION GLASSES

(76) Inventor: Kevin Maloncon, 1610 Redwood Way, Upland, CA (US) 91784

( * ) Notice: Subject to any disclaimer, the term of this patent is extended or adjusted under 35 U.S.C. 154(b) by 0 days.

(21) Appl. No.: 09/906,217

(22) Filed: Jul. 16, 2001

(51) Int. Cl.[7] .................................................. G02C 9/00
(52) U.S. Cl. ............................ 351/45; 351/47; 351/158
(58) Field of Search ................................. 351/227, 228, 351/229, 230, 231, 222, 200, 204, 158, 41, 49, 57, 47, 45, 46

(56) References Cited

U.S. PATENT DOCUMENTS

| 1,794,571 A | * | 3/1931 | Wrighton et al. ............ 351/227 |
| 2,064,812 A | | 12/1936 | Bouchard |
| 2,380,481 A | | 7/1945 | Tillyer et al. |
| 2,565,362 A | | 8/1951 | Eloranta |
| 3,944,346 A | | 3/1976 | Shindler |
| 4,948,244 A | | 8/1990 | Jones |
| 5,210,552 A | | 5/1993 | Baran et al. |
| 5,663,779 A | | 9/1997 | Karasawa |
| 5,841,506 A | | 11/1998 | Karasawa et al. |
| 5,841,507 A | | 11/1998 | Barnes |
| 5,883,688 A | | 3/1999 | Chao |
| 5,914,765 A | | 6/1999 | Wang |

* cited by examiner

Primary Examiner—Hung Xuan Dang

(57) ABSTRACT

The present invention 10 discloses protective eyewear adaptable to fully adjustable glare reducing eyeglasses for use by three to six month post-operative lasik surgery patients 12. The present invention 10 utilizes two selectively rotatable visual aspect gear wheels 14 with each having a plurality of various sized apertures 18 thereon that are aligned at the user's discretion with viewing recesses 52 on mounting brackets or plates 48 in front of each of the user's eyes in order to restrict glare accordingly and increase visual capabilities during recovery. The frame of the present invention has removable extendible ear arms 34 and a gear-driven telescoping front lens and ear arm support bracket 28 to allow the user 12 to adjust the width of the glasses 10 accordingly.

15 Claims, 11 Drawing Sheets

FULLY ADJUSTABLE GLARE REDUCTION GLASSES

BACKGROUND OF THE INVENTION

1. Field of the Invention

The present invention relates generally to protective eyewear and, more specifically to fully adjustable glare reducing eyeglasses for three to six month post-operative lasik surgery patients. The present invention utilizes two selectively rotatable visual aspect gear wheels with each having a plurality of various sized apertures that are aligned at the user's discretion with viewing recesses on gear mounting plates in front of each of the user's eyes in order restrict glare accordingly and increase visual capabilities during recovery. The frame of the present invention has removable extendible ear arms and a gear driven telescoping front lens and ear arm support bracket to allow the user to adjust the width of the glasses accordingly.

2. Description of the Prior Art

Numerous protective eyewear has been provided in prior art. Typical of these is U.S. Pat. No. 2,064,812 issued to Samuel E. Bouchard on Dec. 22, 1936.

Another patent was issued to Edgar D. Tillyer et al. on Jul. 31, 1945 as U.S. Pat. No. 2,380,481. Yet another U.S. Pat. No. 2,565,362 was issued to Vaito K. Eloranta on Aug. 21, 1951 and still yet another was issued on Mar. 16, 1976 to Anthony Shindler as U.S. Pat. No. 3,944,346. Another patent was issued on Aug. 14, 1990 to Billy R. Jones as U.S. Pat. No. 4,948,244. Another patent was issued to Patrick Baran et al. on May 11, 1993 as U.S. Pat. No. 5,210,552 and one more patent was issued on Sep. 2, 1997 as U.S. Pat. No. 5,663,779 to Naoki Karasawa. U.S. Pat. No. 5,841,506 was issued to Naoki Karasawa et al. on Nov. 24 1998 and another patent was issued to Elwood E. Barnes on Nov. 24, 1998 as U.S. Pat. No. 5,841,507. Still another patent was issued to David Yinkai Chao on Mar. 16 1999 as U.S. Pat. No. 5,883,688. U.S. Pat. No. 5,914,765 was issued on Jun. 22, 1999 to Chia Hung Wang.

U.S. Pat. No. 2,064,812

Inventor: S. E. Bouchard

Issued: Dec. 22, 1936

In a pair of goggles, two eye units, an extensible bridge connecting said eye units, each eye unit having a polarizing element fixedly mounted therein, and a worm for rotating said rotatable element, extensible means for connecting said worms whereby said rotatable elements can be rotated in unison and means for rotating said extensible means.

U.S. Pat. No. 2,380,481

Inventor: E. D. Tillyer et al.

Issued: Jul. 31, 1945

An optical mounting comprising spaced cells aligned with the two eyes, a pair of spaced light polarizing means mounted in each cell in holding means having peripheral gear teeth, a turn rod having worm gears engaging the teeth of the holding means of each cell, a quarter wave member positioned between the polarizing members in each cell and held in holding means for the wave member in each cell, said wave member holding means to be frictionally engaged by the holding means of the polarizing members to turn as a unit with said members, and being independently turnable with respect to the polarizing members by means of said central gear wheel.

U.S. Pat. No. 2,565,362

Inventor: V. K. Eloranta

Issued: Aug. 21, 1951

In a variable density goggle, a lens and a lens mount assembly comprising a front housing having a forwardly extended portion inwardly spaced from the edge of said housing and having means provided right eye and left eye apertures and having, a rear housing, a unitary light-polarizing lens element having a right eye portion and a left eye portion positioned between said housings and within said forwardly extending portion, a spacer element fixedly positioned between said unitary lens and said rear housing and having means providing right eye aperture.

U.S. Pat. No. 3.944.346

Inventor: Anthony Shindler

Issued: Mar. 16, 1976

Spectacles having a face-formed readily separable two-section eyeglass frame front wherein a first forward section of the frame front supports a pair of fixed non-circular light-polarizing lenses and a rearward second section supports a rotatable light-polarizing lens in alignment with each forwardly disposed lens. A manually operable rear lens rotating mechanism is provided for selectively rotating the two rearward lenses in unison to simultaneously equally rotationally alter the orientation of axes of polarization of these lenses relative to axes of polarization of the fixed forwardly disposed lenses for correspondingly varying the intensity of light permitted to pass through each system of front and rear lenses of the spectacles.

U.S. Pat. No. 4,948,244

Inventor: Billy R. Jones

Issued: Aug. 14, 1990

Rotatable, multiple lens eye glasses having a frame by which a lens body is supported and by which the eye glasses are adapted to be worn by a person. The frame includes a circumferentially extending U-shaped channel member which rotatably receives a lens body therewithin. Means on said lens body for imparting rotation thereto. Said lens body having a plurality of magnifying lenses formed thereon, whereby rotation of the lens body brings a selected power lens into alignment with the eyes.

U.S. Pat. No. 5,210,552

Inventor: Patrick Baran et al.

Issued: May 11, 1993

A pair of variable density sunglasses include two lens elements of polarized material forming each lens. The other lens element is rotatable in a channel in the frame by manipulation of a gear mounted on the nose bridge, the gear teeth being engaged with gear teeth on the edge of the outer lens element. Rotation of the gear is limited by a peg extending from the back thereof into an arcuate channel on the nose bridge. The stationary inner lens is prevented from rotation by an edge tab extending into an opening in the lens channel through which the gear and rotatable lens engage.

U.S. Pat. No. 5,663,779

Inventor: Naoki Karasawa

Issued: Sep. 2, 1997

A sealed, polarizing lens assembly including a frame, a first light polarizing lens element, a second light polarizing lens element superimposed with the first lens element and rotatable in relation to the first lens element. The frame and the first element define a sealed chamber in which the second element is entirely enclosed and rotatable relative to the first pair of elements. Means for rotating the second internal element in the sealed chamber relative to the first pair of elements are provided. In one form the means for rotating the internal element in the seal chamber comprise a sealed gearing mechanism with user-accessible external actuators. The sealed, easily adjusted lens assembly of the invention prevents contamination of internal lens surfaces by dust and moisture, for example. The seal chamber can also be provided with a fluid or gas with desired optical or thermal barrier characteristics.

U.S. Pat. No. 5,841,506

Inventor: Naoki Karasawa et al.

Issued: Nov. 24, 1998

A lens assembly is disclosed comprising at least first and second removably superimposed eyewear elements each comprising a frame member including framing means for at least one lens. Each frame member has a first longitudinal curvature in an unassembled condition of the lens assembly, and at least the at least second eyewear element further has a flexible intermediate portion providing for longitudinal flexibility of the at least second eyewear element along a transverse medial axis thereof such that the at least second eyewear element is deformable to defame a second longitudinal curvature complimentary with the first longitudinal curvature of the at least first eyewear element when the at least first and second eyewear elements are removably axially superimposed in longitudinal alignment.

U.S. Pat. No. 5,841,507

Inventor: Elwood E. Barnes

Issued: Nov. 24, 1998

A device for selectively reducing the intensity of light in the field of view of an eye or of an optical instrument is described. The device can reduce the light intensity emanating from multiple sources. In one embodiment, an eye gear has a frame, a power source, a light sensor, two light transmissive lenses having an array of shutter elements, user controls and processing circuitry. The user controls are utilized to set user constants to customize the apparatus, and may be used to select a mode of operation. During operation, the light sensor scans the field of view and produces light intensity signals. These light intensity signals are processed with the user constants and preset threshold values. If the light intensity signals exceed any of the threshold values, then one or more elements of the shutter matrices of each lens is darkened.

U.S. Pat. No. 5,883,688

Inventor: David Yikai Chao

Issued: Mar. 16, 1999

An eyeglass apparatus includes a primary frame having two side studs for pivotally coupling two legs. An auxiliary frame for disposing in front of the primary frame includes two sides each having an extension for engaging with the outer portion of the leg. The extensions each includes a magnet for engaging with another magnet engaged in the leg or with the magnetic leg and for securing the auxiliary frame to the primary frame. The extensions each includes a clamping member for securing to the legs without the magnets.

U.S. Pat. No. 5,914,765

Inventor: Chia Hung Wang

Issued: Jun. 22, 1999

A pair of eyeglasses includes a focus adjusting device including an auxiliary frame formed with two lens frames, two annular ring-like wheels rotatably fitted within the two lens frames, a flexible loop member connecting the two annular ring-like wheels, two lenses fitted in the two annular ring-like wheels, an engaging plate fixedly mounted on an intermediate portion of an inner side of the auxiliary frame and provided with a hook, and a main frame provided with a pair of temples for fitting over ears of a user and having two lens frames in which are fitted two lenses, the main frame having an inner side being provided with a recess dimensioned to receive the hook of the engaging plate, whereby the eyeglasses can be adjusted to change the focus as desired.

SUMMARY OF THE PRESENT INVENTION

The present invention discloses protective eyewear adaptable to fully adjustable glare reducing eyeglasses for use by three to six month post-operative lasik surgery patients. The present invention utilizes two selectively rotatable visual aspect gear wheels with each having a plurality of various sized apertures thereon that are aligned at the user's discretion with viewing recesses on mounting plates in front of each of the user's eyes in order to restrict glare accordingly and increase visual capabilities during recovery. The frame of the present invention has removable extendible ear arms and a gear-driven telescoping front lens and ear arm support bracket to allow the user to adjust the width of the glasses accordingly.

A primary object of the present invention is to provide glare reduction glasses for post-operative lasik surgery patients having a rotating visual aspect gear wheel wherein the user rotates said gear wheel to align apertures therein with a viewing recess in the mounting bracket to reduce or eliminate glare caused by excess light striking the eyes from peripheral angles.

An additional object of the present invention is to provide glare reduction glasses wherein the visual aspect gear wheel has apertures of varying sizes including a tight array of smaller apertures to allow the user to readily adjust the range of view as determined by the alignment of the viewing recess of the mounting bracket with the chosen aperture of the visual aspect gear wheel.

A still further object of the present invention is to provide glare reduction glasses wherein each visual aspect gear wheel is independent thereby allowing a user to adjust the field of view according to the needs of each eye.

Another object of the present invention is to provide glare-reducing glasses wherein the front and side lenses could be clear or tinted.

Still another object of the present invention is to provide glare reduction glasses having a frame that telescopes to adjust the width of the glasses to the size of the user's head.

A further object of the present invention is to provide glare reduction glasses having ear arms that are removable and are selectively extendible to maximize the comfort level of the user.

A yet further object of the present invention is to provide glare reduction glasses having a clip on bridge support.

Another object of the present invention is to provide glare-reducing glasses that are economical in cost to manufacture.

Further objects of the present invention will appear as the description proceeds.

To the accomplishments of the above and related objects, this invention may be embodied in the form illustrated in the accompanying drawings, attention being called to the fact, however, that the drawings are illustrative only, and that changes may be made in the specific construction illustrated and described in the appended claims.

BRIEF DESCRIPTION OF THE DRAWINGS

Various other objects, features and attendant advantages of the present invention will become more fully appreciated as the same becomes better understood when considered in conjunction with the accompanying drawings, in which like reference characters designate the same or similar parts throughout the several views.

LIST OF REFERENCE NUMERALS

Figure 1:
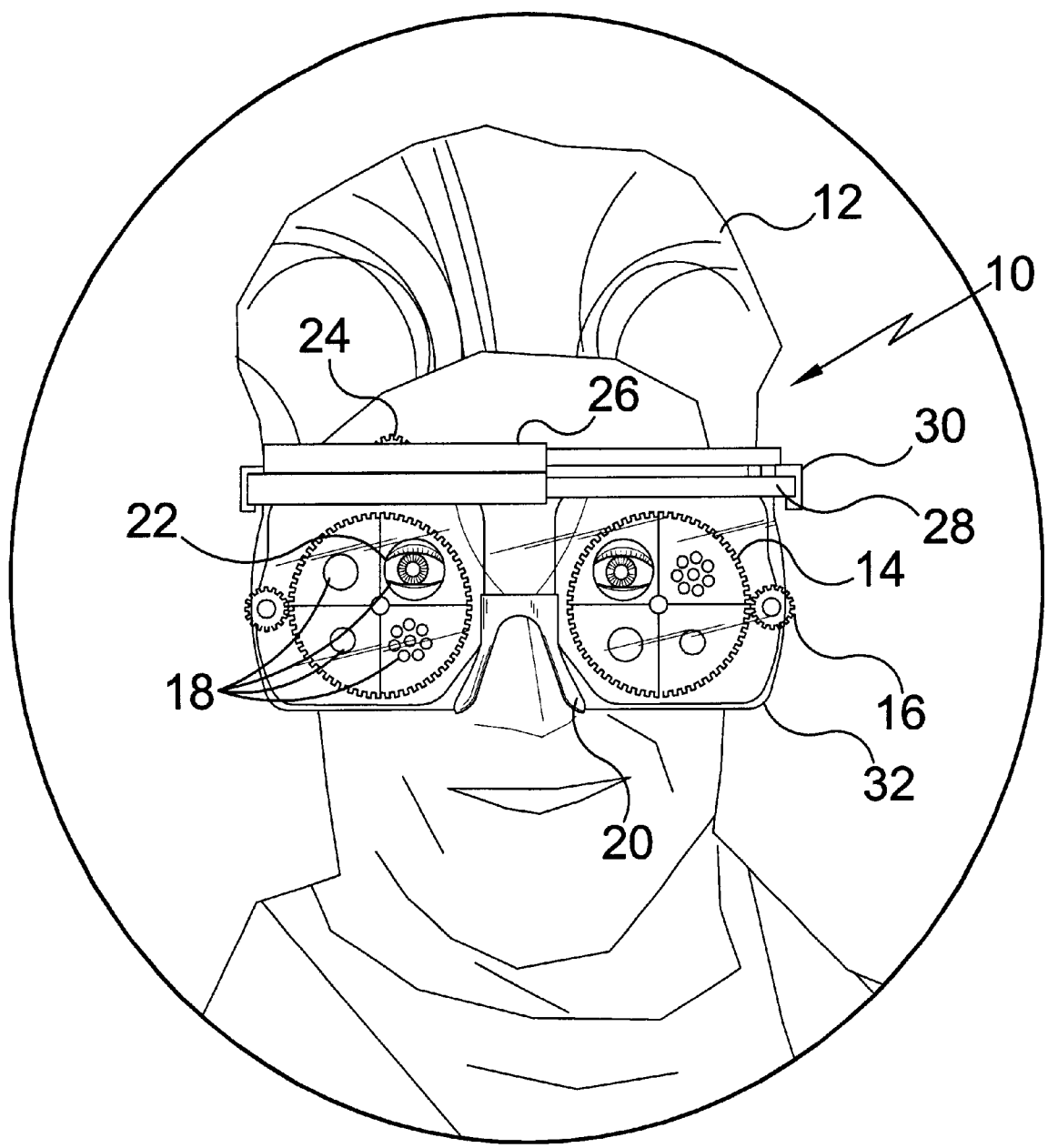
FIG. 1 is a front plan of the present invention in use.

With regard to reference numerals used, the following numbering is used throughout the drawings.

10 present invention
12 user
14 visual aspect gear wheel
16 adjustment gear
18 aperture
20 bridge support
22 eye
24 roller gear
26 telescoping front lens slide gear bar
28 telescoping front lens and ear arm support bracket
30 slide bracket for ear arms
32 tinted lens piece
34 ear arm
38 roller gear slot
40 stop post
42 mounting bracket attachment means
43 snap-on posts
44 teeth of support brackets
46 front lens retaining slot
48 mounting brackets for lens
50 snap-on axle posts
52 view recess
54 attachment means for mounting bracket
56 recess
58 frame assembly
60 gear assembly
62 slide bar cover

DETAILED DESCRIPTION OF THE PREFERRED EMBODIMENTS

The following discussion describes in detail one embodiment of the invention and several variations of that embodiment. This discussion should not be construed, however, as limiting the invention to those particular embodiments, practitioners skilled in the art will recognize numerous other embodiments as well. For definition of the complete scope of the invention, the reader is directed to appended claims.

Turning to FIG. 1, shown therein is a front plan of the present invention 10 in use by a post-operative lasik patient 12. The user 12 turns the visual aspect gear wheel 14 and its adjust gear 16 until the desired aperture or assisted view openings 18 or aperture array is aligned with the viewing recess (not visible, see FIG. 5) of the mounting bracket thereby inhibiting peripheral light that could cause glare and disturb the patient during recovery. Also shown is a clip-on adjustable bridge support 20. Also shown is the user's eye 22 through one of the assisted view openings 18 along with a roller gear 24 disposed on the top of the glasses, a telescoping front lens slide gear bar 26 on top of the glasses, a telescoping front lens and ear arm support bracket 28, a slide bracket for the ear arms 30, along with a tinted lens piece 32.

Figure 2:
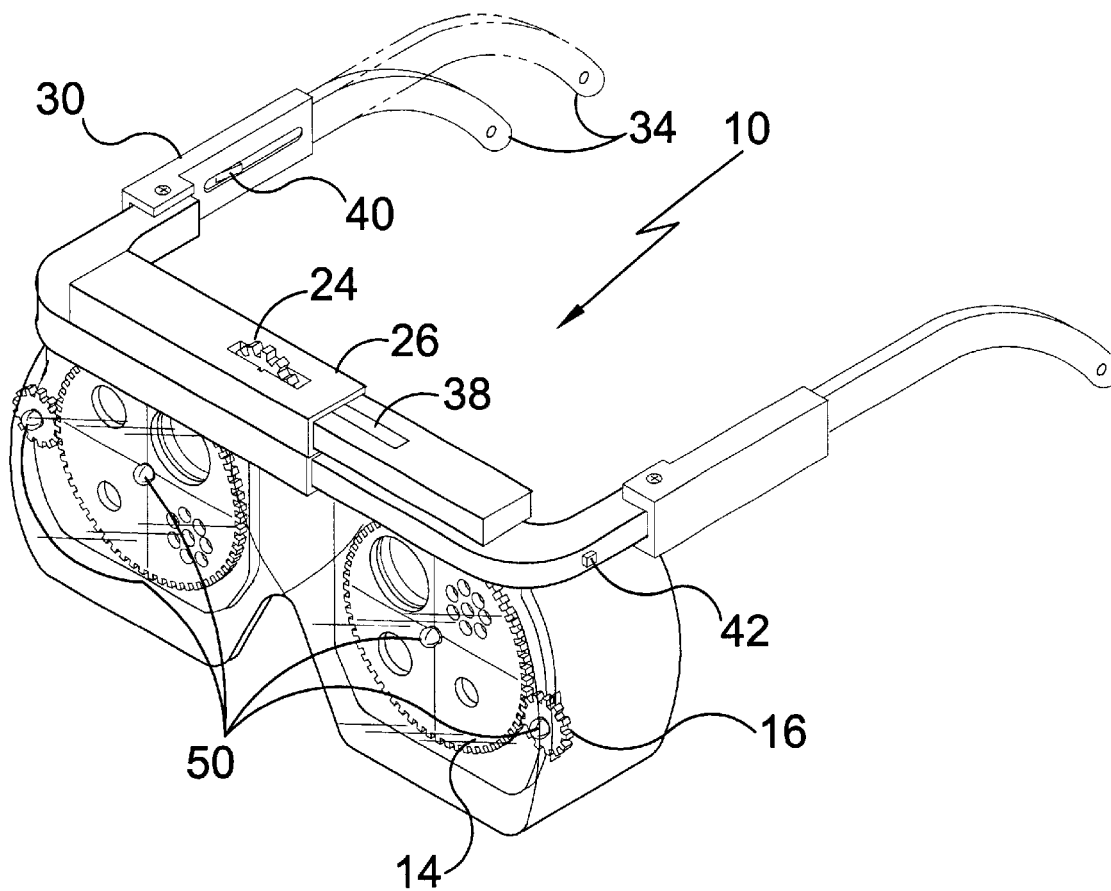
FIG. 2 is perspective view of the present invention.

Turning to FIG. 2, shown therein is a perspective view of the present invention 10 with the generally horizontal adjustability of the ear arm 34 mechanism demonstrated in phantom line. The adjustment gear 16 rotates the visual aspect gear wheel 14 to allow the user to select the appropriate aperture or aperture array. Also shown are the locking axle posts 50 for the visual aspect gear wheels along with the slide brackets for the ear arm 30, the roller gear 24, the slide gear bar 26, the roller gear slot 38, the stop post 40 for the ear arm 34, and the mounting bracket attachment means 42.

Figure 3:
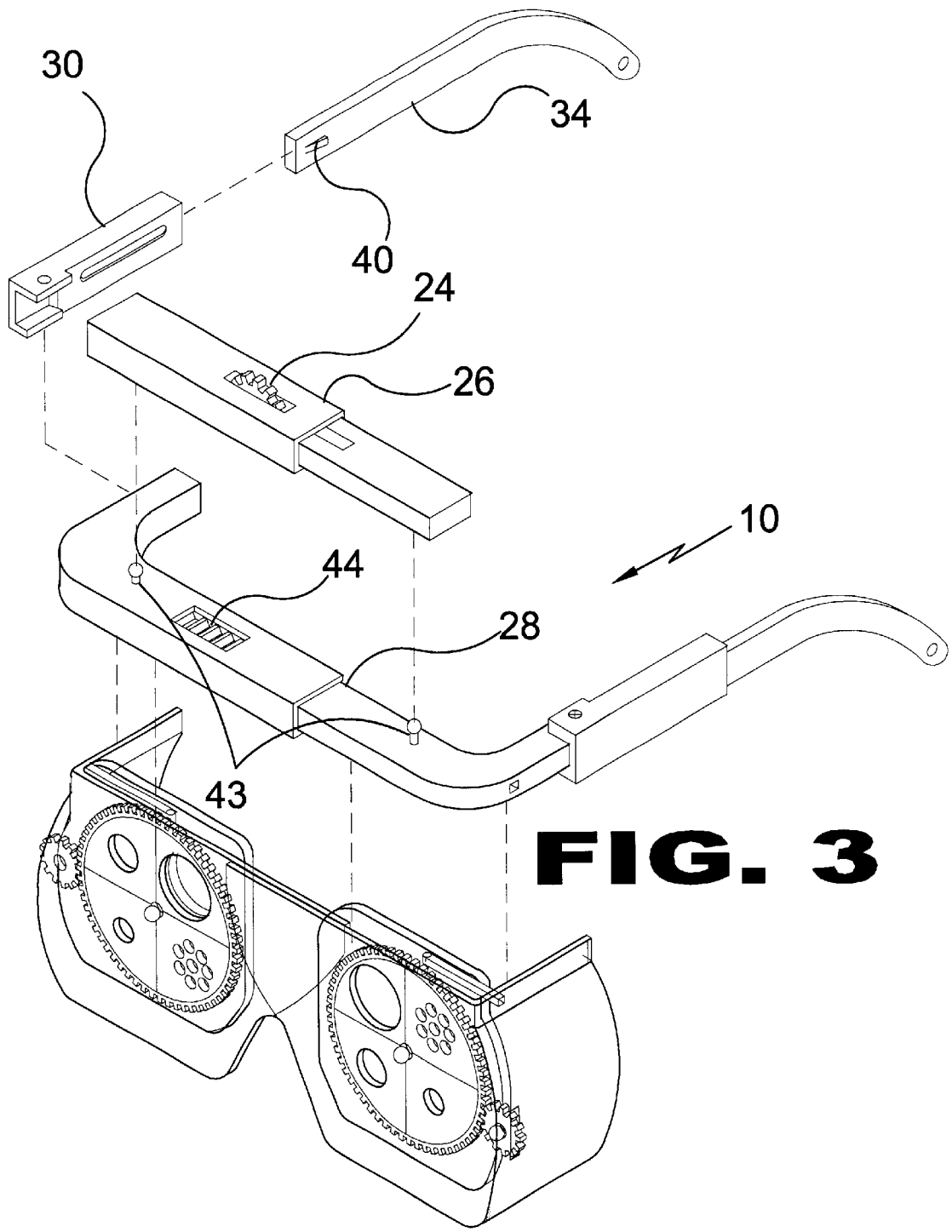
FIG. 3 is an exploded perspective view of the present invention.

Turning to FIG. 3, shown therein is an exploded perspective view of the present invention 10. The slide gear bar 26 and the front lens support bracket 38 are both telescoping having male and female sections and the front lens bracket has snap on posts 43 to mate with corresponding recesses on the underside of the slide gear bar 26. The teeth of the slide gear 24 engage with the teeth 44 of the front lens support bracket ratchet strip to extend or retract the front lens bracket 28 and slide gear bar 26 accordingly. Also shown are the ear arm 34, ear arm stop post 40 and the ear arm slide bracket 30.

Figure 4:
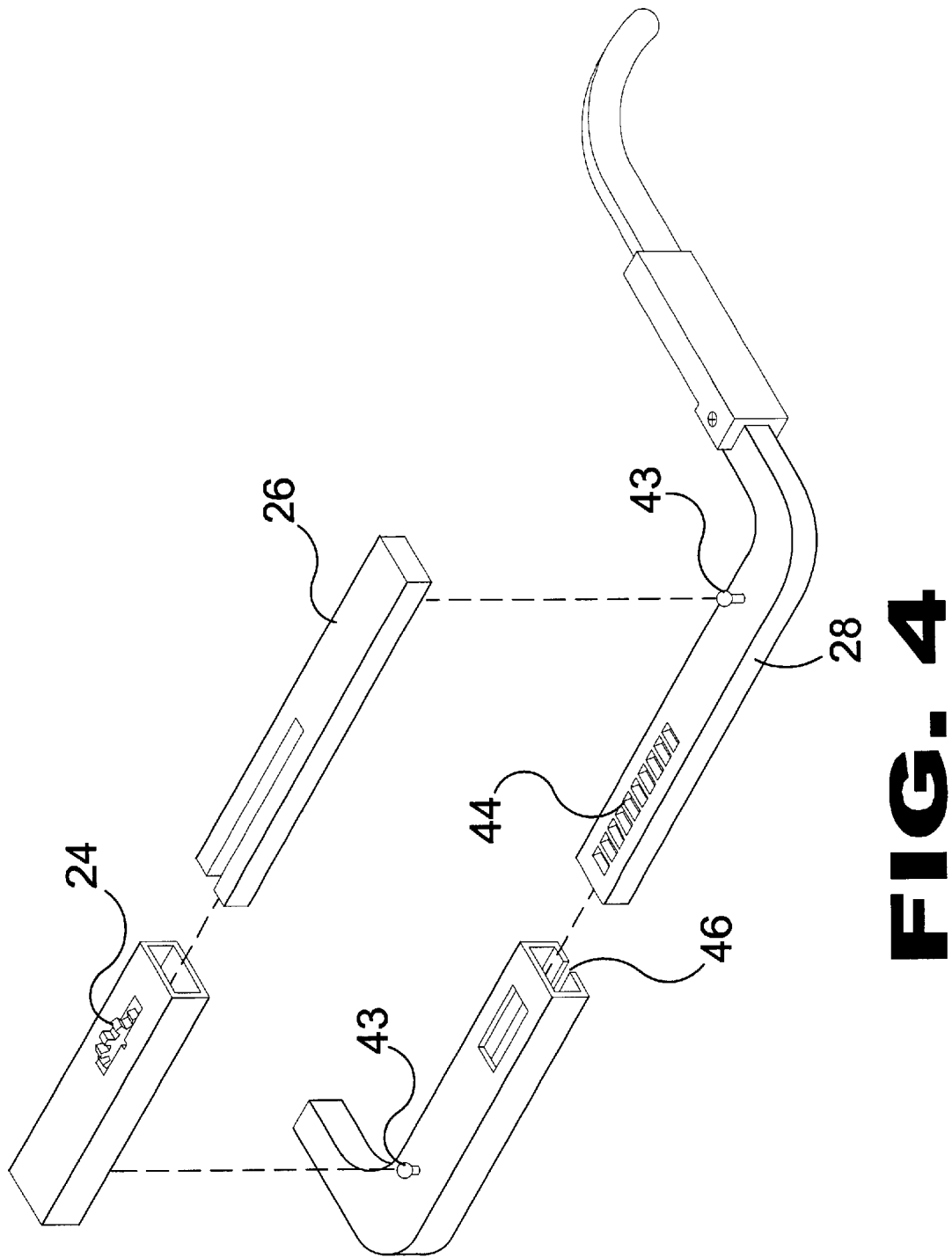
FIG. 4 is an exploded perspective view of the slide gear bar and the front lens support bracket.

Turning to FIG. 4, shown therein is an exploded view of the slide gear bar 26 and front lens support bracket 28. Also shown are the male and female portion of the slide gear bar 26 along with the male and female portion of the front lens support bracket 28 having snap-on posts 43 disposed on its top surface for mating with the underside of the slide gear bar 26. Also shown are the ratchet teeth 44 of the front lens support bracket 28 along with the front lens-retaining slot 46.

Figure 5:
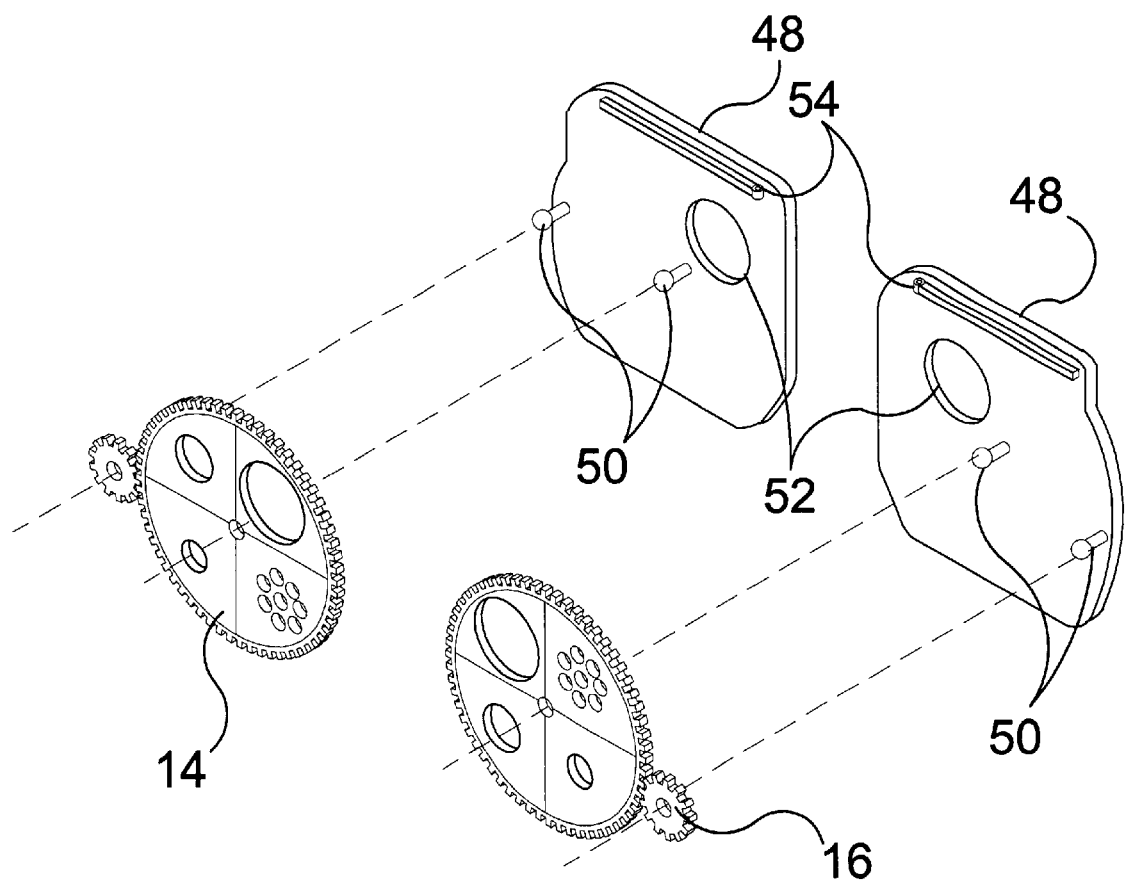
FIG. 5 is an exploded perspective view of the visual aspect gear wheels and their respective adjustment gears and mounting brackets.

Turning to FIG. 5, shown therein is an exploded perspective view of the visual aspect gear assembly showing the mounting brackets 48 ready to receive their respective visual aspect gear wheels 14 and adjustment gears 16. Also shown are a plurality of snap-on axle posts 50 which align with the visual aspect gear wheel 14 and adjustment gear 16, along with a view recess 52 and attachment means 54 for the mounting brackets 48.

Figure 6:
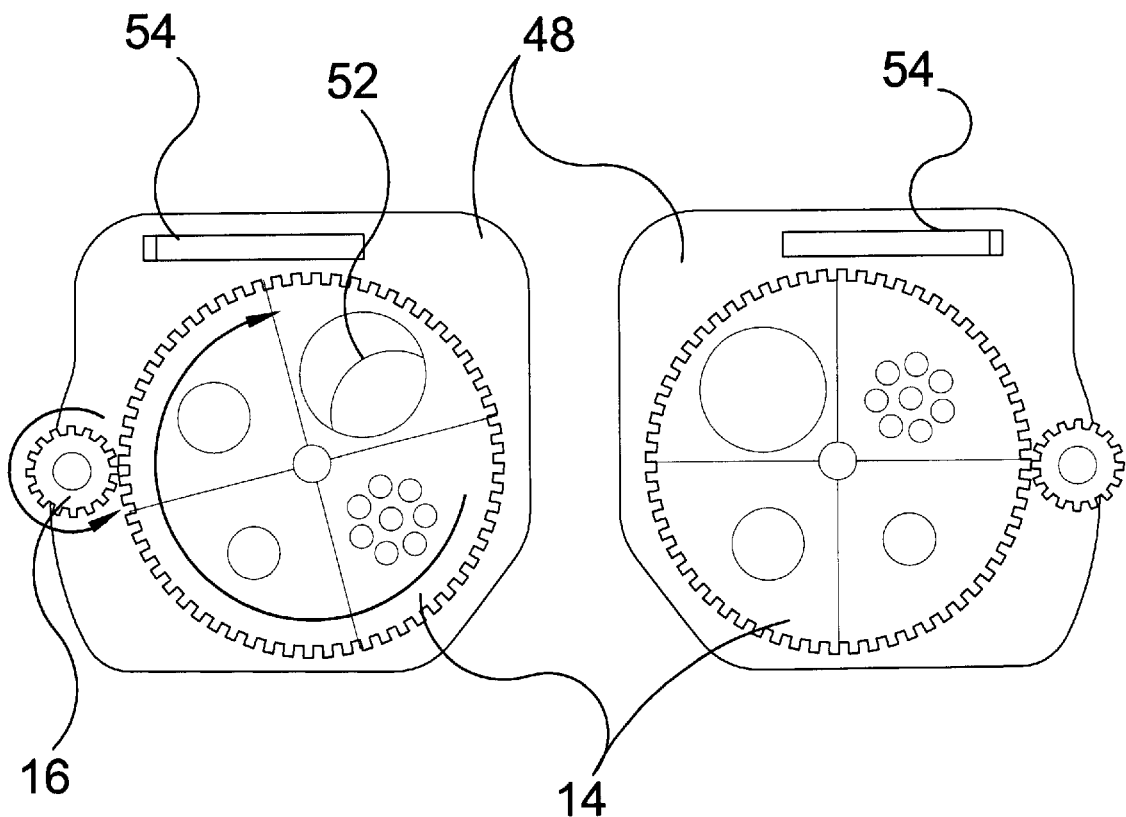
FIG. 6 is a front plan of the visual aspect gear wheels and their respective adjustment gears mounted onto their mounting brackets.

Turning to FIG. 6, shown therein is a front plan view of the gear assemblies showing the visual aspect gear wheels 14 and adjustment gears 16 on their respective mounting brackets 48. The arrows indicate the movement of the gears 14, 16 as the left gear assembly is being rotated to correspond with the right gear assembly and aligning the large aperture of the visual aspect gear 14 with the viewing recess 52 of the mounting bracket 48.

Figure 7:
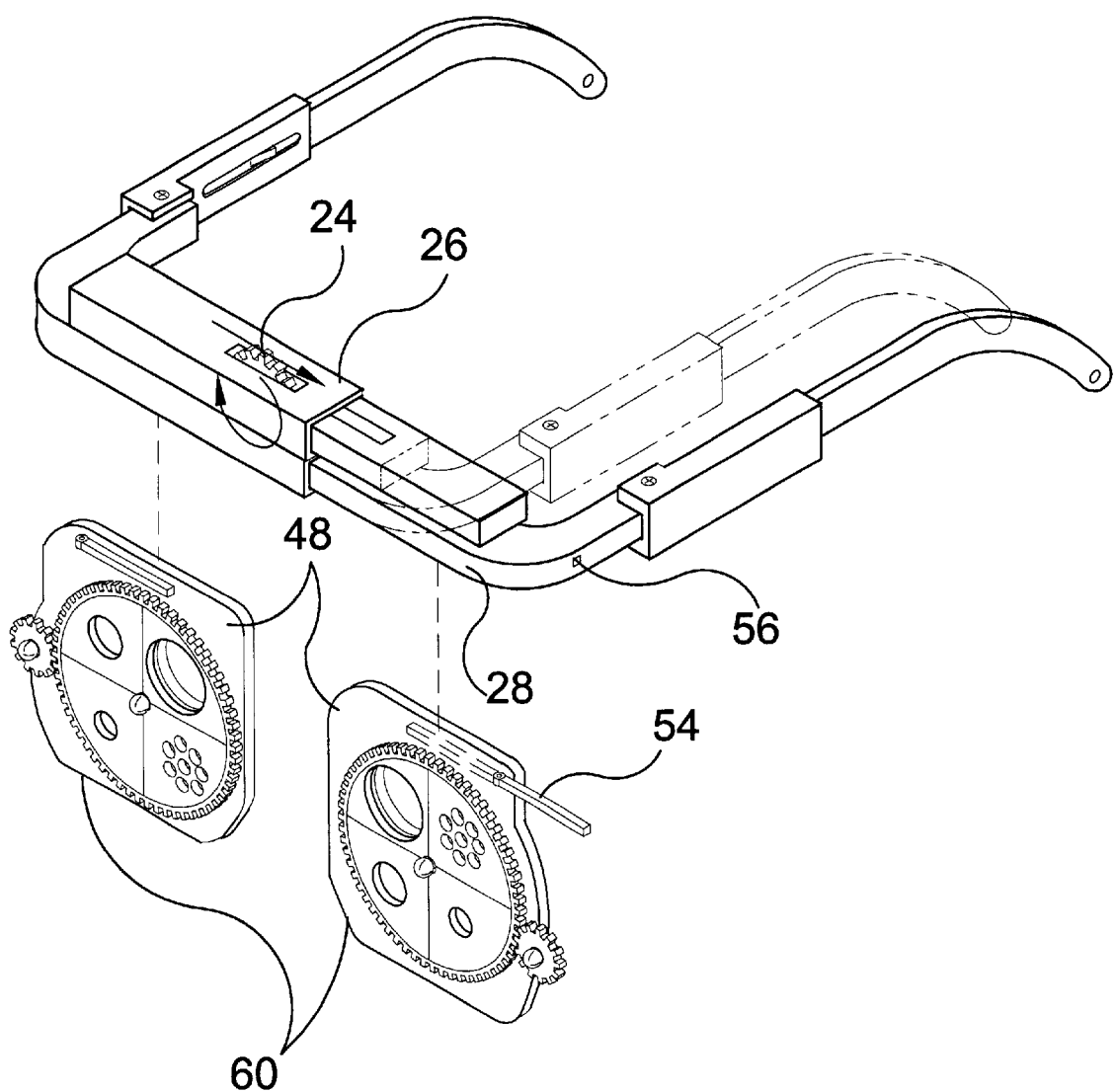
FIG. 7 is an exploded perspective view of the assembled frame and the mounted visual aspect gear assemblies ready to be inserted therein.

Turning to FIG. 7, shown therein is an exploded view of the gear and frame assemblies showing the gear assemblies 60 ready to be inserted into the frame assembly. Arrows indicate how turning the roller gear 24 acts upon the ratchet teeth of the front lens and ear arm support bracket 28 to adjust the width of the glasses 10 as needed. Also shown are the mounting brackets 48, attachment means 54, roller gear slide bar 26, and recess 56 for receiving the mounting bracket attachment means 54.

Figure 8:
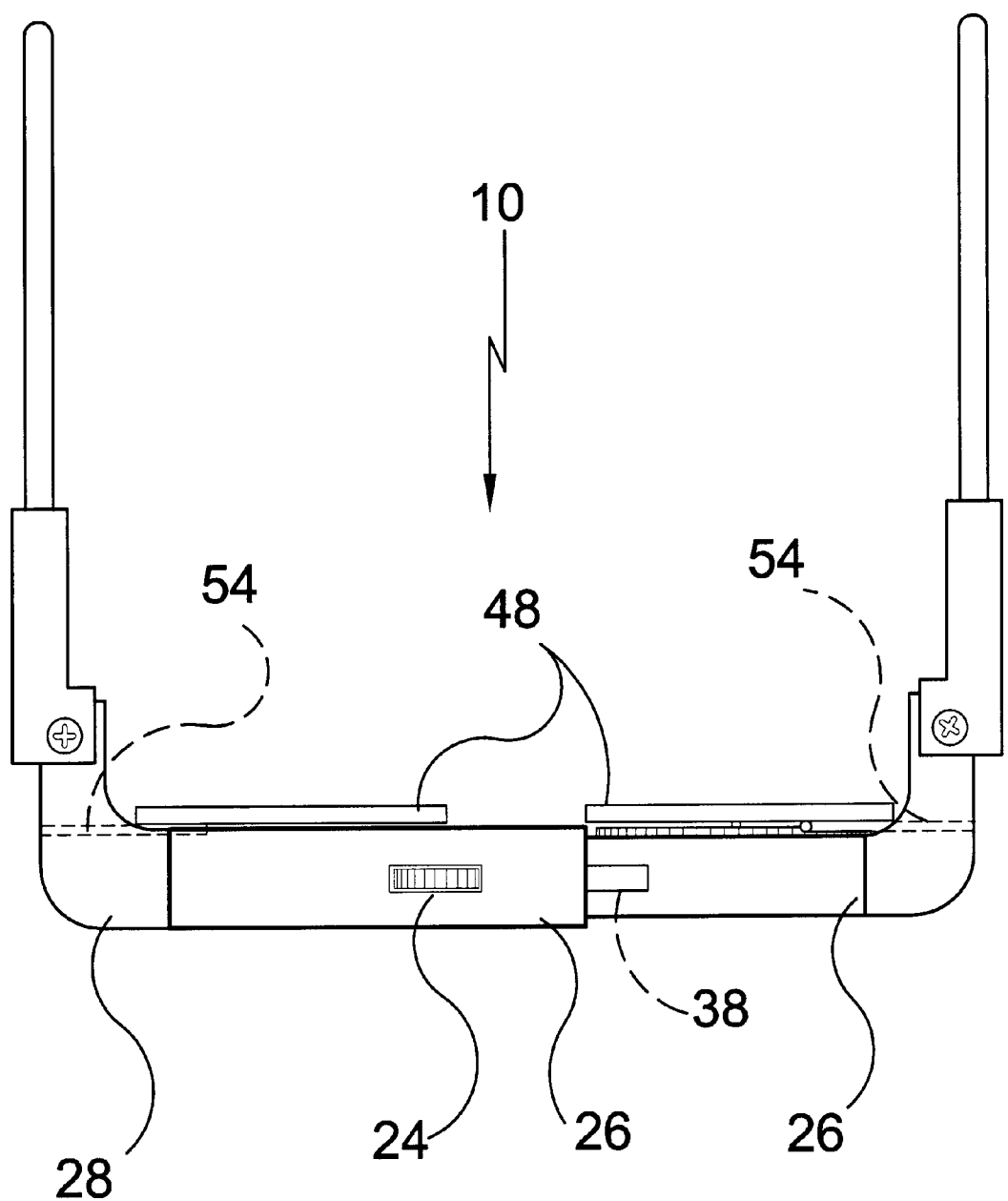
FIG. 8 is a top view of the present invention.

Turning to FIG. 8, shown therein is a top view of the present invention 10 showing the mounting brackets 48 inserted into the front lens support bracket and maintained by the mounting bracket attachment means 54. Also shown are the roller gear 24, roller gear slot 38, front lens support bracket 28, and the male and female portions of the slide gear bar 26.

Figure 9:
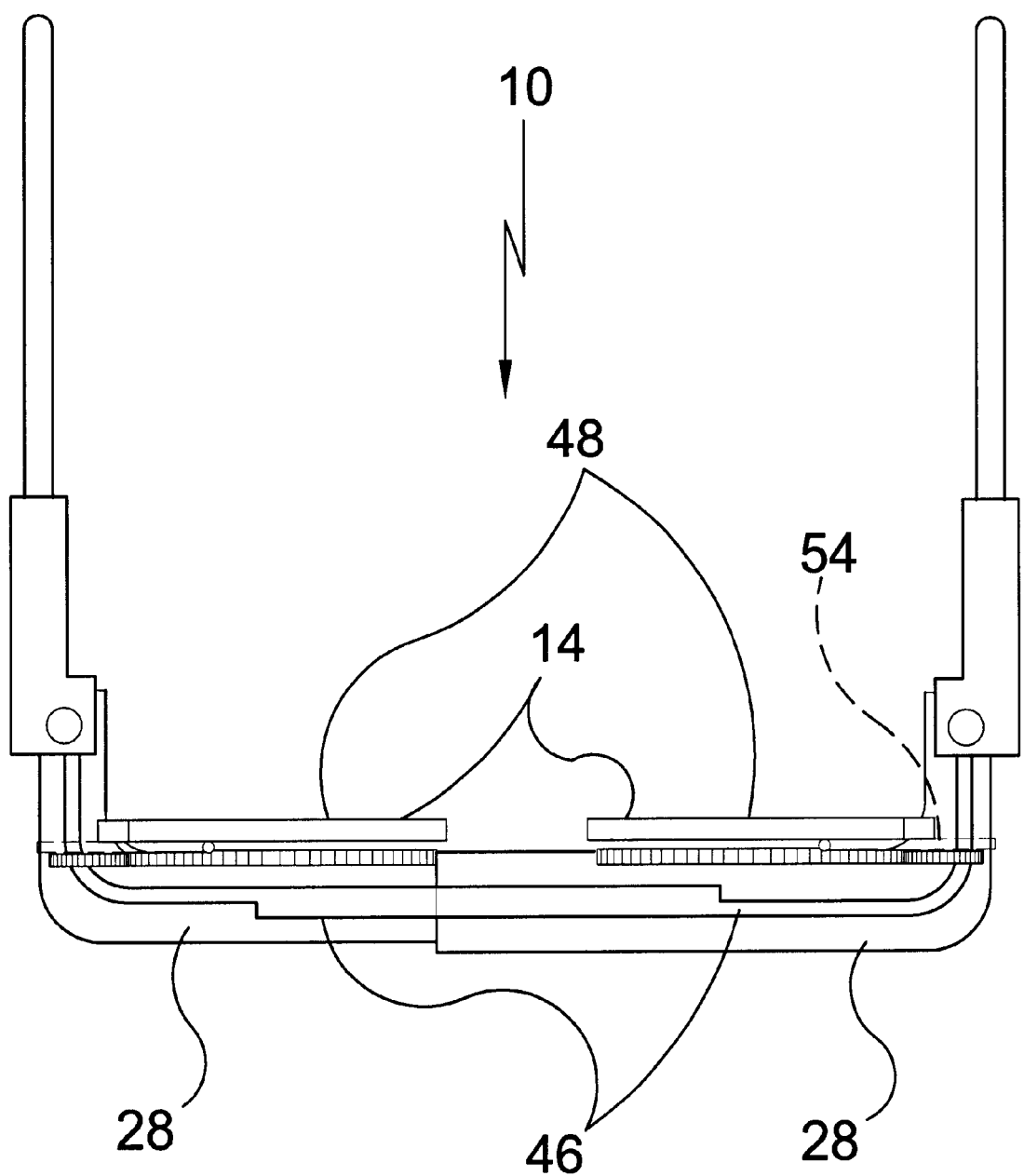
FIG. 9 is a bottom view of the present invention.

Turning to FIG. 9, shown therein is a bottom view of the present invention 10 showing the mounting brackets 48 inserted into the front lens support bracket 28 and maintained by the mounting bracket attachment means 54. Both lens sections have been removed to reveal the front lens-retaining slot 46. When the lens sections are installed they are maintained securely within the retaining slot 46 which is wider in the central area to accommodate the overlapping lens sections. Also shown are the visual aspect gear wheels 14 and the male and female front lens support bracket 28.

Figure 10:
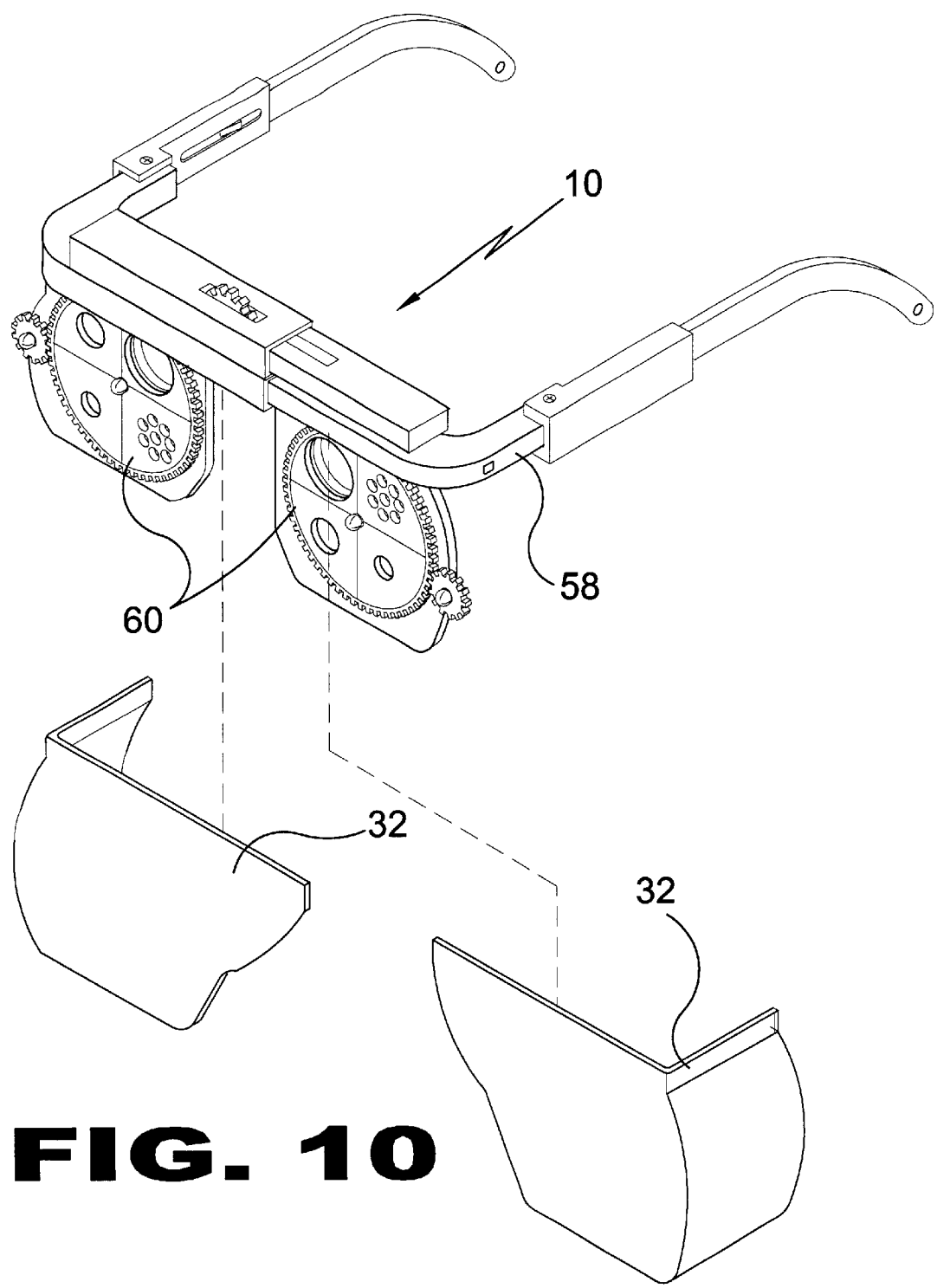
FIG. 10 is an exploded perspective view of the present invention showing the two lens pieces ready for insertion.

Turning to FIG. 10, shown therein is an exploded perspective view of the present invention 10 showing the overlapping lens pieces 32 ready to be inserted into the frame assembly 58. The lenses may be clear or tinted. Also shown is the gear assembly 60.

Figure 11:
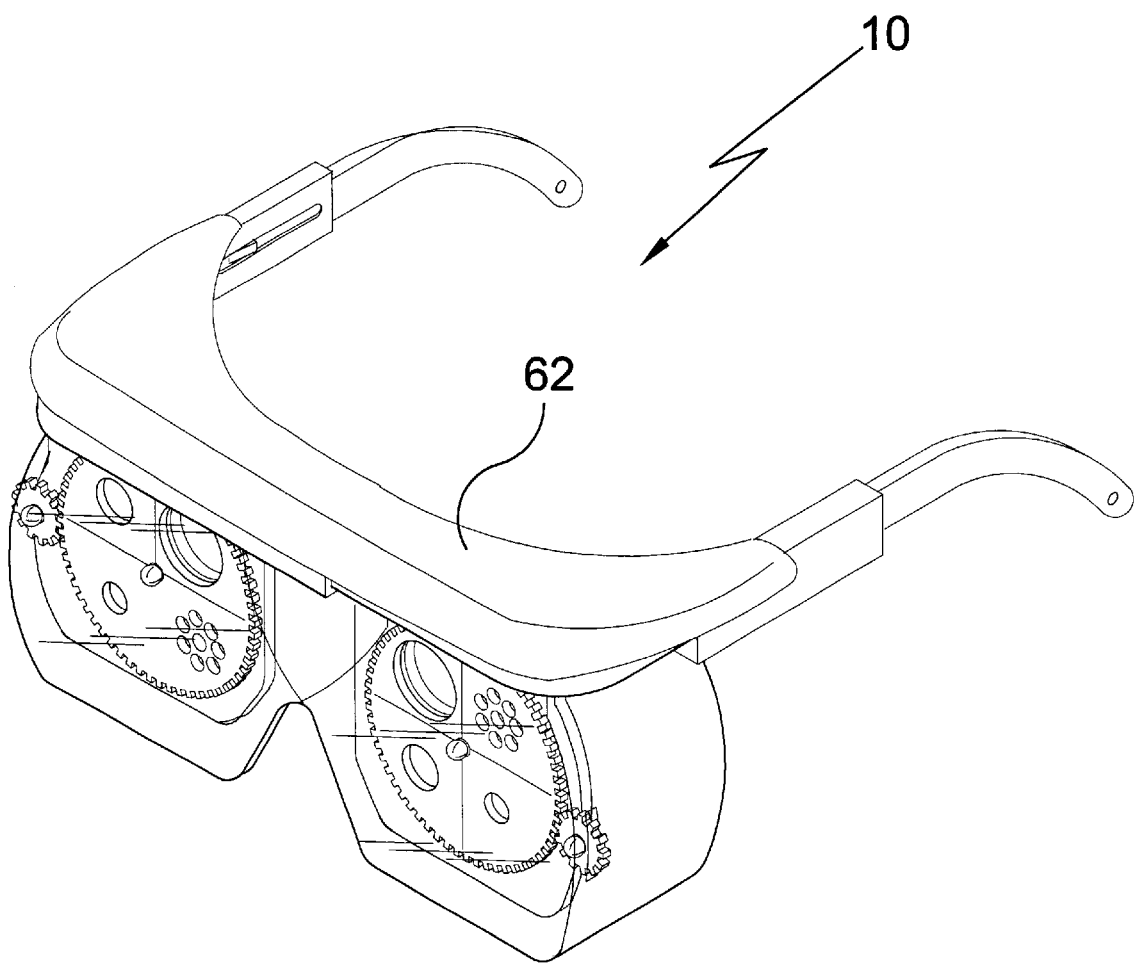
FIG. 11 is a perspective view of the present invention with a combination slide bar cover and upper light shield installed thereon.

Turning to FIG. 11, shown therein is a perspective view of the present invention 10 with a combination slide bar cover and upper light shield 62 installed thereon. Upper light shields 62 could be integrated with the present invention or added as an accessory as shown in order to prevent light from entering from above. Slide bar covers 62 could also be used to improve the aesthetics of the present invention.

I claim:

1. An apparatus for a pair of eyeglasses to be worn about the face of a user being supported by the nose and ears of the user, comprising:
   a) means for a telescoping lens and ear arm support bracket whereby a pair of lens and a pair of ear arms are mounted;
   b) means for a telescoping gear bar disposed on top of said means for a telescoping lens and ear arm support bracket, whereby the width of said means for a telescoping lens and ear arm support bracket is adjusted;
   c) means for a pair of mounting plates disposed on said means for a telescoping lens and ear arm support bracket, whereby a gear assembly is disposed thereon, said means for a pair of mounting plates each having a recess therein, said recess for alignment with the eyes of the user;
   d) means for a pair of visual aspect gear wheels rotatably disposed on said means for a mounting bracket, said means for a pair of visual aspect gear wheels having a plurality of apertures therein, whereby said apertures can be aligned with the eyes of the user; and,
   e) means for rotating said means for a pair of visual aspect gear wheels, whereby the user can select said aperture to be aligned with the eyes of the user.

2. The apparatus of claim 1, wherein said means for a telescoping lens and ear arm support bracket further comprises a male and a female support bracket portion, said male and female portions being joined substantially between the eyes of the user.

3. The apparatus of claim 2, further comprising a pair of snap-on posts disposed on top of said support bracket for connection to the lower side of said means for a telescoping gear bar.

4. The apparatus of claim 3, further comprising means for extendable ear arms disposed on said support bracket, whereby the length of said ear arms are made adjustable.

5. The apparatus of claim 4, wherein said means for extendable ear arms further comprise an ear arm having a first curved end and a second straight end, said straight end having a stop post disposed thereon, said means for extendable ear arms further comprising an ear arm slide bracket disposed thereon having a slot therein, said slot for receiving said stop post of said ear arm therein.

6. The apparatus of claim 5, wherein said ear arm slide bracket is foldably disposed on said support bracket.

7. The apparatus of claim 6, wherein said means for a telescoping gear bar further comprises a male and female gear bar, said male and female portions joined substantially between the eyes of the user.

8. The apparatus of claim 7, further comprising a roller gear disposed on said female portion of said bear bar, said roller gear having teeth disposed on the periphery thereof so that said teeth cooperate with serrations in said male portion of said support bracket so that the width of said support bracket and said gear bar are made adjustable in response to rotation of said roller gear by the user.

9. The apparatus of claim 8, wherein said means for a pair of mounting plates further comprises a plate having edges extending beyond and substantially covering the eye of the user, said plate being perpendicular to the eyesight of the user.

10. The apparatus of claim 9, further comprising means for attaching said mounting plates to said support bracket whereby said mounting plates are removably, fixedly attached to said support bracket.

11. The apparatus of claim 1, wherein said means for rotating said means for a pair of visual aspect gear wheels further comprises gear wheels having teeth on the periphery thereof and an adjustment gear having gear teeth disposed on the periphery thereof, said teeth of said adjustment gear for contacting said teeth of said visual aspect gear wheel and thereby rotating said visual aspect gear wheel in response to rotation of said adjustment gear by the user.

12. The apparatus of claim 11, further comprising a pair of snap-on posts disposed on each mounting plate, one each of said pair of snap-on posts for receiving one said visual aspect gear wheel, and the other of said pair of snap-on posts for receiving said adjustment gear.

13. The apparatus of claim 12, wherein said plurality of apertures on said visual aspect gear wheels further comprise a first aperture complementarily sized as said recess on said means for a pair of mounting plates, a second aperture smaller than said first aperture, a third aperture smaller than said second aperture, and an array of apertures smaller than said third aperture, wherein said first, second, and third apertures and said array of apertures are each disposed in a different quadrant of said visual aspect gear wheel.

14. The apparatus of claim 13, further comprising a pair of eye lens disposed on the bottom of said male and female portion of said support bracket.

15. The apparatus of claim 14, further comprising a nose support disposed between said pair of eye lens, said nose support contacting the nose of the user.

* * * * *